(12) United States Patent
Schuetz et al.

(10) Patent No.: US 12,448,216 B2
(45) Date of Patent: Oct. 21, 2025

(54) CHAIN LINK, PLATE-LINK CHAIN AND CHAIN CONVEYOR

(71) Applicant: Schenck Process Europe GmbH, Darmstadt (DE)

(72) Inventors: Andreas Schuetz, Darmstadt (DE); Stefan Goetz, Darmstadt (DE)

(73) Assignee: Qlar Europe GmbH, Darmstadt (DE)

( * ) Notice: Subject to any disclaimer, the term of this patent is extended or adjusted under 35 U.S.C. 154(b) by 123 days.

(21) Appl. No.: 18/369,741

(22) Filed: Sep. 18, 2023

(65) Prior Publication Data

US 2024/0010435 A1    Jan. 11, 2024

Related U.S. Application Data

(63) Continuation of application No. PCT/EP2022/057123, filed on Mar. 18, 2022.

(30) Foreign Application Priority Data

Mar. 19, 2021    (DE) .................... 10 2021 106 744.8

(51) Int. Cl.
  *B65G 17/06*    (2006.01)
  *B65G 17/42*    (2006.01)
(52) U.S. Cl.
  CPC ........... *B65G 17/065* (2013.01); *B65G 17/42* (2013.01)
(58) Field of Classification Search
  CPC .... B65G 17/065; B65G 17/066; B65G 17/12; B65G 17/44; B65G 17/42; F16G 13/06; F16G 13/18
  See application file for complete search history.

(56) References Cited

U.S. PATENT DOCUMENTS 2,954,113 A * 9/1960 Hibbard ............... B65G 17/065
                                                                198/867.14
2,955,700 A * 10/1960 Badger ................. B65G 17/42
                                                                198/851

(Continued)

FOREIGN PATENT DOCUMENTS

DE        10031898 A1    3/2001
EP        0284595 A1    9/1988
(Continued)

OTHER PUBLICATIONS

International Search Report dated Jul. 14, 2022 in corresponding application PCT/EP2022/057123.

*Primary Examiner* — Mark A Deuble
(74) *Attorney, Agent, or Firm* — Muncy, Geissler, Olds & Lowe, P.C.

(57) ABSTRACT

A chain link for a plate-link chain of a chain conveyor having two substantially flat side walls, which are spaced apart from, and parallel to, each other in a transverse direction (x-direction) of the chain link and securely fastened together, and two force introduction components. Every force introduction component protrudes outwards in the transverse direction (x-direction) from its associated side wall for the purpose of fastening it to a conveyor belt of the chain conveyor and is a component that is separate from the side walls. The force introduction components are substantially flat and every force introduction component is interlockingly connected to its associated side wall. A plate-link chain having multiple chain links and a chain conveyor comprising a plate-link chain are also provided.

12 Claims, 2 Drawing Sheets

(56) References Cited

U.S. PATENT DOCUMENTS

| | | | | |
|---|---|---|---|---|
| 3,393,792 | A * | 7/1968 | Virta | B65G 17/44 198/851 |
| 3,842,968 | A * | 10/1974 | Owens | B65G 17/065 198/851 |
| 4,096,943 | A * | 6/1978 | Gentsch | B65G 17/42 198/851 |
| 4,518,077 | A | 5/1985 | Ronco et al. | |
| 5,042,244 | A * | 8/1991 | Worsley | F16G 13/18 59/93 |
| 6,471,041 | B1 * | 10/2002 | Long | B65G 17/44 198/867.14 |
| 6,615,974 | B2 | 9/2003 | Scholz | |
| 6,945,387 | B1 * | 9/2005 | Christensen | B65G 17/02 198/849 |
| 7,293,643 | B2 * | 11/2007 | Burkhard | B65G 17/38 198/712 |
| 7,325,674 | B2 * | 2/2008 | Dufhaus | B65G 17/44 198/867.14 |
| 8,272,504 | B2 * | 9/2012 | Neugebauer | B65G 19/025 198/867.15 |
| 9,388,546 | B2 * | 7/2016 | Quinones | B65G 17/44 |
| 2024/0132291 | A1 * | 4/2024 | Schuetz | B65G 17/10 |

FOREIGN PATENT DOCUMENTS

| | | |
|---|---|---|
| EP | 1236661 A1 | 9/2002 |
| JP | S60137716 U | 9/1985 |

* cited by examiner

CHAIN LINK, PLATE-LINK CHAIN AND CHAIN CONVEYOR

This nonprovisional application is a continuation of International Application No. PCT/EP2022/057123, which was filed on Mar. 18, 2022, and which claims priority to German Patent Application No. 10 2021 106 744.8, which was filed in Germany on Mar. 19, 2021, and which are both herein incorporated by reference.

BACKGROUND OF THE INVENTION

Field of the Invention

The present disclosure relates to a chain link/support plate for a plate-link chain of a chain conveyor, in particular a plate belt conveyor, having two substantially flat side walls/plates which are spaced apart from, and parallel to, each other in a transverse direction (x-direction) of the chain link and securely fastened together, and two force introduction components/support angles, wherein every force introduction component protrudes outwards in the transverse direction (x-direction) from its associated side wall for the purpose of fastening it (in a manner transmitting a driving force) to a conveyor belt of the chain conveyor and is a component that is separate from the side walls. The present disclosure further relates to a plate-link chain having multiple such chain links, and to a chain conveyor comprising such a plate-link chain.

Description of the Background Art

In general, a chain conveyor is a continuous conveyor for transporting general cargo or bulk material. The present disclosure is focused in particular on a chain link for a plate-link chain of a plate belt conveyor. Such plate belt conveyors are used in particular in the heavy-duty area of bulk material conveying to transport large and/or sharp-edged bulk materials. The plate belt conveyor has multiple conveyor plates, which can usually have a width of 800 mm to 2000 mm and a length of 100 mm to 300 mm. The conveyor plates are mounted on rails over (non-driven) rollers in order to be able to absorb the high weight of the bulk material. The plate belt conveyor is driven by the plate-link chain, which transmits a tensile force in the chain circulation direction via the chain links of the plate-link chain to the individual conveyor plates, thus driving them. Usually, the chain links are fastened to the individual conveyor plates from below via connecting elements, such as screws. The force introduction components of the chain links, which protrude in the transverse direction from the side walls/(main) plates/plate bodies of the chain link and preferably have a through hole through which the chain links can be screwed to the individual plates, serve this purpose.

In general, chain links and plate-link chains with such chain links are already known from the prior art.

For example, EP 1 236 661 A1, which corresponds to US 2002/0130016, discloses a chain in the manner of a pin chain, wherein the link chain has pot-shaped outer bushings, in each of which a pin end section is arranged, and serves as a conveyor chain for a cell conveyor, the endless conveyor line of which is formed of the chain and multiple conveyor cells fastened to it in series one behind the other, circulates around two deflection wheels arranged at the ends of the conveyor line, one of which is driven, with the other acting as a tensioning wheel. The chain has multiple inner plates arranged in pairs with mutual transverse spacing parallel to each other as well as to the chain longitudinal axis, and mirror-symmetrically to the same, each of which being connected to each other by forming an inner chain link by two pins running at right angles to the chain longitudinal axis, each of which extending through the two inner plates of a pair of plates assigned to them. In addition, the chain has two outer plates with an essentially L-shaped cross-section, each of which hinges two inner plates of two adjacent inner chain links that are adjacent to each other in the longitudinal direction of the chain. The chain is to be firmly connected to the rear wall of the conveyor cells of the cell conveyor, wherein the one leg of each outer plate running parallel to the inner plates is interspersed with two adjacent pins of two adjacent inner chain links, and the other leg running parallel to the outside of the rear wall of the relevant conveyor cell in the assembly state is to be firmly connected by connecting elements, such as in particular screw connections, to a rear wall of a conveyor cell or a supporting bracket or the like, and wherein the middle section of a pin has a larger diameter than the two pin end sections. Accordingly, the outer plates of the EP 1 236 661 A1 form L-shaped outwardly bent fixing brackets through which the chain can be connected to the rear wall of the conveyor cell.

Also, from EP 0 284 595 A1, for example, a chain for a chain conveyor is known, with elongated chain links arranged in parallel planes, which are connected to each other by transverse pins, wherein two adjacent transverse pins are connected to each other by two pairs of plates at a distance from each other forming a plate link, and each pair of plates formed of at least one inner plate and one outer plate each, wherein adjacent plate links are connected to each other by round or sectional steel links directly attacking the transverse pins of the plate links with the inner sides of their link curves or by interposing a bearing, wherein at least one round steel link is arranged between the plates of a pair of plates. In the case of the chain disclosed in EP 0 284 595 A1, the outer plates are designed as angled plates, in which a bar on the outer plate is bent outwards by 90°.

However, the decisive factor for the chain links known so far is that the production of their L-shaped cross-section from a side wall/a plate and a force introduction component/support angle forms the weak point of the chain links. A first option for manufacturing the chain links is that an L-shaped support angle/an L-shaped force introduction component is fastened to the associated side wall by welding. A second option for manufacturing the chain links is to bend an area of each side wall outwards to create the outwardly protruding force introduction component.

However, the disadvantage of this is, on the one hand, that a weld seam or a bending point has only a limited strength, at which a material failure, such as a fracture, can occur. In addition, high-strength steels are used to increase the strength of the chain links, which, for example, have an increased breaking load or tensile strength due to appropriate heat treatment. However, such high-strength steels can neither be joined by welding nor bent into an L-shaped cross-section, as they acquire spring-elastic properties through heat treatment, so that it is not possible to attach the force introduction components by welding and/or bending/folding.

SUMMARY OF THE INVENTION

It is therefore the object of the present disclosure to avoid, or at least to reduce, the disadvantages from the prior art. In particular, the strength of a chain link is to be increased without impairing its functionality, in particular with regard to its attachment to a chain conveyor via force introduction components.

In an example of the invention, the chain link has two substantially flat side walls/plates which are arranged parallel to each other in a transverse direction (x-direction) of the chain link and are securely fastened together. The transverse direction (x-direction) corresponds to a direction transverse to a chain circulation direction. The chain link can, for example, be designed as an inner plate or an outer plate, although this will be explained later with reference to the plate-link chain.

Preferably, the two side walls can be securely fastened to each other by means of two connecting elements spaced apart in the longitudinal direction (z-direction) of the chain link. The longitudinal direction (z-direction) of the chain link corresponds to the chain circulation direction. In particular, the two side walls of the chain link can be connected to each other by pins or sleeves. The chain links can be designed as inner chain links/inner plates may be connected to each other by sleeves and chain links designed as outer chain links/outer plates may be connected to each other by pins.

The chain link can have two force introduction components, wherein every force introduction component protrudes outwards in the transverse direction (x-direction) from its associated side wall for the purpose of fastening it to a conveyor belt of the chain conveyor, in particular the plate belts of the plate belt conveyor. In particular, the force introduction components protrude at right angles to the associated side wall. This means that a first force introduction component protrudes outwards from a first side wall in a first transverse direction (x-direction) and a second force introduction component protrudes outwards from a second side wall in a second transverse direction (x-direction), which is opposite to the first transverse direction (x-direction). In other words, the two force introduction components protrude outwards in a transverse direction (x-direction) facing away from the other side wall. Thus, each side wall, together with the force introduction component, forms an L-shaped cross-section, i.e., an angle.

Preferably, every force introduction component can have at least one mounting hole in one vertical direction (y-direction) of the chain link through which the chain link can be fastened to the conveyor plates. In particular, every force introduction component can be fastened to the conveyor plates by means of connecting elements, such as screws, reaching through in the vertical direction (y-direction) of the chain links. For example, the mounting hole may have a rectangular cross-section, so that it is possible to attach the force introduction component via a carriage bolt or the like, which is positively secured against twisting.

Every force introduction component can be a component that is separate from the side walls. This means that the force introduction component is not made by bending an area of the side wall (i.e., as an integral part of the plate). This has the advantage that the manufacturability of the chain link is simplified, as the separate components can be designed with a simpler geometry.

Preferably, the force introduction components can substantially be flat. This means that the force introduction component is substantially flat and can therefore be manufactured in a simple manner, for example, from a semi-finished sheet metal part. This means that high-strength steels can also be used as force introduction components, as no forming is necessary.

Every force introduction component can be interlockingly connected to the associated plate, at least in the longitudinal direction (z-direction) of the chain link, preferably in the longitudinal direction (z-direction) and a vertical direction (y-direction) of the chain link. In contrast to well-known chain links, the force introduction component and the side wall are therefore not integrally (by bending) and not materially connected (by welding), but via an interlocking connection between the two components. It is possible to transmit higher forces, which are very high particularly in the longitudinal direction (z-direction) of the chain link during operation of the chain conveyor, via an interlocking connection than via a material-locking connection. In addition, the interlocking connection ensures the secure fastening of the separately designed individual parts.

Also, every force introduction component may have a main body and a peg protruding from the main body. The peg of the force introduction component may be inserted into a preferably slot-shaped opening in the associated side wall in the transverse direction (x-direction).

For example, the opening may be designed as a through hole (in the material thickness direction of the plate which, when mounted, corresponds to the transverse direction (x-direction) of the chain link) and the peg may be arranged reaching through the side wall. This means that the interlocking connection is a plug-in connection that can be connected or loosened in the transverse direction (x-direction) of the chain link.

The two force introduction components may be plugged into the associated side wall in mutually opposite directions of the transverse direction (x-direction). This means that the insertion direction of the first force introduction component is opposite to the insertion direction of the second force introduction component. Preferably, the two force introduction components can each be plugged into the associated side wall from the outside. The opposite orientation of the two insertion directions has the advantage that in order to loosen the plug connection of the first force introduction component, a relative movement must take place between the first force introduction component and the associated side wall, but this is prevented by the plug connection between the second force introduction component and the associated side wall. Due to the fact that the two force introduction components are firmly connected to the conveyor plates during operation of the plate-link chain, it is not possible to move the two force introduction components to each other, so that they mutually prevent each other from coming loose from the plug connection.

The force introduction components and the side walls may be matched to each other in such a way that the insertion depth of the force introduction components into the side walls is limited. In other words, a stop for the force introduction component may be provided on the side wall, which positively limits the position of the force introduction component relative to the side wall in the transverse direction (x-direction), particularly in the respective insertion direction. Thus, every force introduction component prevents a relative movement between the force introduction component and the associated side wall in its insertion direction, wherein the opposite orientation of the insertion directions in turn prevents the relative movement of both side walls in each insertion direction, i.e., in the transverse direction (x-direction). Thus, in a state in which the force introduction components are securely fastened to the plate belts, displacement of the side walls and the force introduction components to each other in the transverse direction (x-direction) is prevented. At the same time, mounting is guaranteed, as the force introduction components can simply be plugged in from the outside, as long as they are not both securely fastened to the plate belts.

The peg may have a smaller cross-section than the main body. This has the advantage that the main body forms a stop surface in the transverse direction (x-direction), so that the insertion depth of the peg is limited in the insertion direction. In other words, the main body of the force introduction component rests against the side wall. In this way, the insertion depth can be limited in a particularly simple manner.

The peg may have a smaller width than the main body of the force introduction component. Thus, the main body rests against the side wall in its area protruding beyond the width of the peg. Thus, a cross-section reduction is realized over the width of the peg as compared to the main body, and not over its height, which has the advantage that the material strength of the force introduction component is only slightly weakened.

The extension of the opening in a longitudinal direction (z-direction) of the chain link may substantially correspond to the width of the peg. This means that the force introduction component and the side wall are interlockingly connected to each other in the longitudinal direction (z-direction) without backlash. In addition or alternatively, the extension of the opening in the vertical direction (y-direction) of the chain link may essentially correspond to the thickness of the peg. This means that the force introduction component and the side wall are interlockingly connected to each other in the vertical direction (y-direction) without backlash. Preferably, therefore, the opening and the peg have essentially the same cross-section. The pin and the opening may be matched to each other in such a way that the pin can be inserted into and pulled out of the opening without tools. For example, the longitudinal extension of the opening may be slightly larger than the width of the peg, i.e., up to 1 mm, preferably up to a maximum of 0.5 mm. In other words, the opening and the peg form a loose plug connection that can be joined and disconnected manually/by hand/without tools. The cross-sections are coordinated in such a way that the side wall and the force introduction component are essentially securely fastened to each other in the longitudinal direction by the plug-in connection, but the plug-in connection can be (easily) loosened in the transverse direction (x-direction).

The edges of the opening and the peg may be rounded to prevent stress peaks and consequent cracking when deformed under load.

A first transport lock opening may be formed in the peg, into which a first locking element for temporary fastening of the force introduction component to the associated side wall can be plugged in such a way that the first locking element engages behind material of the associated side wall against the insertion direction of the pin. The first locking element can preferably be designed as a clamping pin or clamping sleeve. The force introduction components are only prevented from falling out in the transverse direction (x-direction) by their attachment to the conveyor plates. During transport or when disconnected from the conveyor plates, they can come loose from the connector. In order to avoid loosening during transport, the peg can be prevented from falling out of the opening against its insertion direction by the locking element.

The chain link may have a spacer for every force introduction component that rests on the force introduction component, in particular the main body of the associated force introduction component and is flush with an upper edge of the associated side wall in a vertical direction (y-direction) of the chain link and/or forms an outermost edge of the chain link. This has the advantage that the force introduction component, which must be surrounded by material from the side wall in the vertical direction (y-direction) due to the interlocking fastening in the vertical direction (y-direction), can be clamped by the spacer with the conveyor plates in the vertical direction (y-direction). Thus, no torque is generated on the connection between the force introduction component and the side wall when fastening the force introduction component to the conveyor plates.

For example, the spacer may have at least one fastening opening, preferably designed as a through hole and aligned with the mounting hole of the force introduction component, the cross-section of which being at least as large as the cross-section of the mounting hole of the force introduction component. This has the advantage that the connecting elements for fastening the chain link to the conveyor plates can simply be passed through the spacers and thus also fastened.

The spacer may be substantially flat, and the thickness of the spacer may be substantially equal to the thickness of the force introduction component. This has the advantage that the spacer and the force introduction component can be made from the same sheet metal. In addition, a particularly simple form of spacer can be selected.

The spacer and the force introduction component may have aligned second transport lock openings into which a second locking element can be inserted for temporary fastening of the spacer to the force introduction component. The second transport lock opening of the spacer and/or the second transport lock opening of the force introduction component can preferably be designed as (a) through hole (s). The second locking element can preferably be designed as a clamping pin or clamping sleeve. This means that the spacers only rest loosely on the force introduction components and are only fastened to the force introduction components when the chain link is fastened to the conveyor plates. Without this attachment, they can come loose during transport or in the state when they are separated from the conveyor plates. In order to avoid loosening during transport, the spacer can be prevented from slipping down from the force introduction components by the second locking element.

The side walls and the force introduction components may be made of a steel having a material strength of 700 N/mm$^2$ to 1600 N/mm$^2$. This has the advantage that the chain link has increased strength.

The present disclosure also relates to a plate-link chain for a chain conveyor, having multiple chain links as described, wherein a first number of the chain links are designed as inner plates, a second number of the chain links are designed as outer plates, the inner plates and the outer plates are alternately arranged in a chain circulation direction, adjacent inner plates and outer plates are hinged together in the chain circulation direction, and the side walls of the inner plates are arranged in the transverse direction (x-direction) between the side walls of the outer plates.

The present disclosure also relates to a chain conveyor, in particular a plate belt conveyor, having a described plate-link chain and multiple plate belts which can be driven via the plate-link chain in the chain circulation direction and to which the chain links are fastened via locking elements reaching through the force introduction components in a vertical direction (y-direction) of the chain links.

In other words, the disclosure relates to a chain link for a plate-link chain/chain that eliminates both the risk of component failure due to cracking in a fold and the risk of component failure due to cracking due to a weld, as well as has reduced manufacturing costs by reducing the complexity of the chain links and increasing tolerance to assembly errors. Thus, the dangers of early chain failure and the associated costs can be eliminated and the service life of the chain can be improved. These effects are achieved by a plate-link chain with force introduction components/support angles, in which the force introduction component or chain link is designed in such a way that the connection is made via a slot in the side wall, into which the force introduction component is inserted with a pin. This creates the slot in the lateral side wall of the chain in an extension of the side wall upwards (y-direction). The chain link has a cone-shaped extension that is inserted into the slot of the side wall, wherein the geometry of the pin and slot is chosen in such a way that a connection is created that is slightly clamped but can be joined by hand. The edges of the slot geometry and the cone geometry can be rounded to prevent stress peaks and consequent cracking when deformed under load. A plate/inner or an outer plate of the chain and its assigned force introduction component have a symmetrical geometry, wherein the force introduction components are of different lengths. In order to avoid confusion during assembly of the components and to enable easy assignment, the force introduction components may have a contour feature for indexing. The force introduction component may have a safety catch/locking mechanism with a clamping pin or clamping sleeve to prevent the force introduction component from falling out between the side wall and the force introduction component during transport and assembly process of the loose plug connection. Thus, a risk of deformation cracks due to bending or folding of the sheets and weld breaks during load-induced deformation can be completely eliminated, thus significantly improving the durability and reliability of the plate-link chain.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
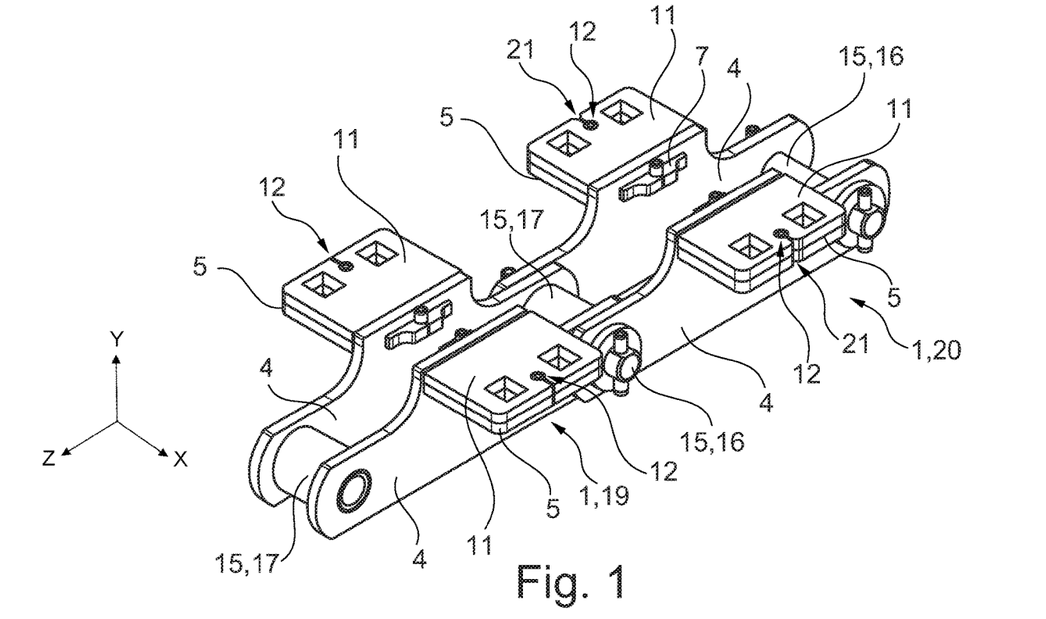
FIG. 1 is a perspective representation of two hinged chain links for a plate-link chain, which are connected to each other in accordance with the disclosure.

FIG. 1 shows two chain links 1 for a plate-link chain 2 of a chain conveyor, in particular a plate belt conveyor 3. In the following, the structure of a chain link 1 is described with reference to FIG. 1 as well as FIGS. 2 to 4, which show a part of such a chain link 1.

The chain link 1 has two substantially flat side walls/plates 4, which can also be referred to as a first side wall 4 and a second side wall 4 and which are spaced apart from, and parallel to, each other in a transverse direction (x-direction) of the chain link 1 and securely fastened together. The transverse direction (x-direction) of the chain link 1 corresponds to a direction transverse to a chain circulation direction. Thus, a longitudinal direction (z-direction) of the chain link 1 corresponds to the chain circulation direction. Each side wall 4 can have a symmetrical construction. The side walls 4 of a chain link 1 can be designed as identical parts.

The chain link 1 has two preferably substantially flat force introduction components 5. The force introduction components 5 protrude outwards from their associated side wall 4 in the transverse direction (x-direction). In particular, the force introduction components 5 protrude at right angles to the corresponding side wall 4. Every force introduction component 5 may have a symmetrical design. The force introduction components 5 of a chain link 1 can be designed as identical parts. The force introduction components 5 are used for the purpose of fastening to a conveyor belt of the chain conveyor, in particular of conveyor plates of the plate belt conveyor 3, which will be explained later with reference to FIG. 5. The two force introduction components 5 can also be referred to as a first force introduction component 5 and a second force introduction component 5. Thus, the first force introduction component 5 protrudes outwards from the first side wall 4 in the transverse direction (x-direction) and the second force introduction component 5 protrudes outwards from the second side wall 4 in the transverse direction (x-direction). As a result, the force introduction components 5 protrude in the mutually opposite direction from the side walls 4, i.e., outwards in a transverse direction (x-direction) facing away from the other side wall 4. Thus, the first force introduction component 5 protrudes from the first side wall 4 in a first transverse direction (x-direction) and the second force introduction component 5 protrudes from the second side wall 4 in a second transverse direction (x-direction), which is opposite to the first transverse direction (x-direction). In other words, each of the side walls 4 forms an L-shaped cross-section with one of the force introduction components 5.

The force introduction components 5 are separate from the side walls 4. This means that every force introduction component 5 is a component separate from the plates 4. To form the chain link 1, the force introduction components 5 are each connected to one of the plates 4. This means that the first side wall 4 is connected to the first force introduction component 5 and the second side wall 4 is connected to the second force introduction component 5

The force introduction components 5 are interlockingly connected to the associated side wall 4 at least in the longitudinal direction of the chain link 1, preferably in the longitudinal direction (z-direction) and one vertical direction (y-direction) of the chain link 1. In contrast to known chain links, the force introduction components 5 and the side walls 4 of the chain link 1 are therefore not connected to each other integrally (by bending) and not materially (by welding), but via an interlocking connection between the two components.

Figure 2:
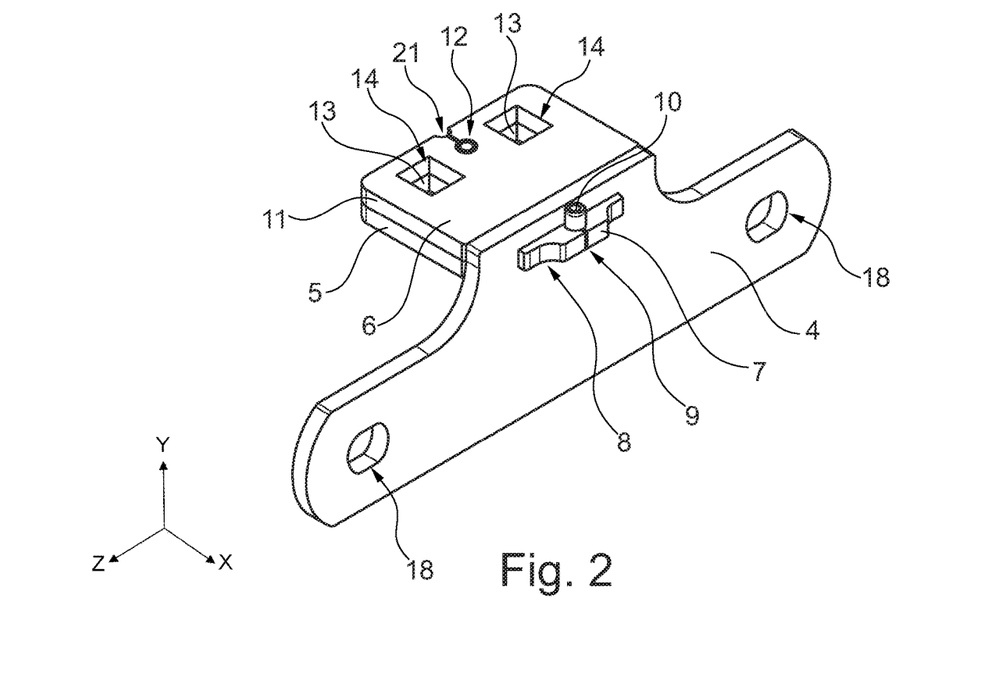
FIG. 2 is a perspective representation of a plate, a force introduction component fastened to it and a spacer, which form part of a chain link according to the disclosure.
Figure 3:
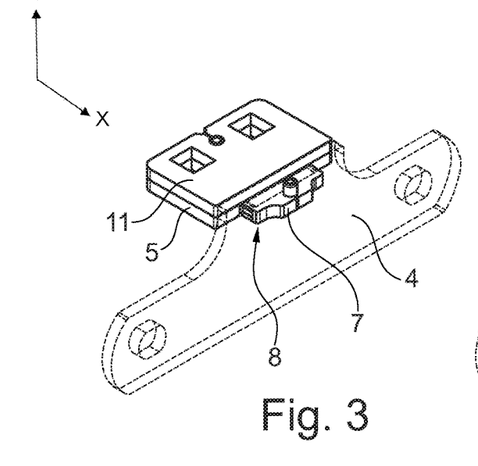
FIG. 3 is a perspective representation of the plate, the force introduction component fastened to it and the spacer from FIG. 2, wherein the side wall is shown transparently.
Figure 4:
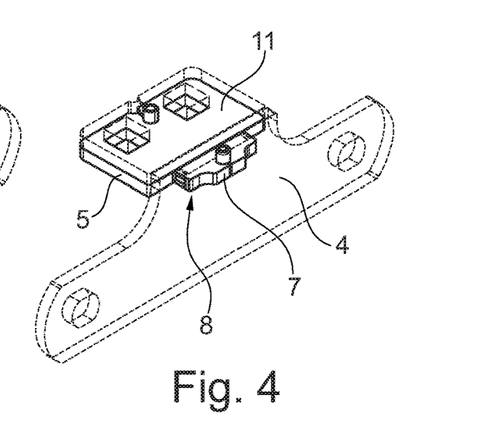
FIG. 4 is a perspective representation of the plate, the force introduction component fastened to it and the spacer from FIG. 2, wherein the sidewall and the spacer are shown transparently.

Preferably, every force introduction component 5 can have a main body 6 and a peg 7 protruding from the main body 6. The peg 7 of the force introduction component 5 may be plugged into a preferably slot-shaped opening 8 in the associated side wall 4 in the transverse direction (x-direction)/may engage with the opening 8 of the side wall 4. In particular, the opening 8 may be designed as a through hole and the peg 7 may be arranged engaging through the side wall 4. This means that the interlocking connection is a plug connection that can be connected or loosened in the transverse direction (x-direction) of the chain link 1.

Preferably, the two force introduction components 5 can each be plugged into the corresponding side wall 4 in opposite directions of the transverse direction (x-direction). This means that one insertion direction of the first force introduction component 5 into the first side wall 4 is opposite to the insertion direction of the second force introduction component 5 into the second side wall 4. Preferably, the two force introduction components 5 can each be plugged into the corresponding side wall 4 from the outside.

In particular, the force introduction components 5 and the side walls 4 may be matched to each other in such a way that the insertion depth of the force introduction components 5 into the side walls 4 is limited. On the side wall 4, a stop may be provided/formed for the inserted force introduction component 5, which positively limits the position of the force introduction component 5 relative to the side wall 4 in the transverse direction (x-direction), in particular in the respective insertion direction. For example, the peg 7 (as well as the opening 8) may have a smaller cross-section than the main body 6. Thus, the main body 6 of the force introduction component 5 rests against the side wall 4 when the force introduction component 5 is plugged in (i.e., when the peg 7 engages with/reach through the opening 8). Preferably, the peg 7 may have a smaller width than the main body 6 of the force introduction component 5. As a result, the main body 6 rests against the side wall 4 in its area protruding beyond the width of the peg 7.

In particular, the extension of the opening 8 in the longitudinal direction (z-direction) of the chain link 1 may be substantially equal to the width of the peg 7. Thus, the force introduction component 5 and the side wall 4 are interlockingly connected to each other in the longitudinal direction (z-direction) without backlash. For example, the extension of the opening 8 in the vertical direction (y-direction) of the chain link 1 can substantially correspond to the thickness of the peg 7. This means that the force introduction component 5 and the side wall 4 are interlockingly connected to each other in the vertical direction (y-direction) without backlash. Preferably, therefore, the opening 8 and the peg 7 have essentially the same cross-section.

Preferably, the peg 7 and the opening 8 may be matched to each other in such a way that the peg 7 can be inserted into the opening 8 and pulled out of the opening 8 without tools. For example, the longitudinal extension (z-direction) of the opening is slightly, i.e., 0 to 1 mm, preferably 0 to 0.5 mm, larger than the peg width, to form a loose plug connection that can be joined and disconnected manually/by hand/without tools. In particular, the edges of the opening 8 and the peg 7 may be rounded.

Preferably, a first transport lock opening 9 may be formed in the peg 7. A first locking element 10 for temporary fastening of the force introduction component 5 to the associated side wall 4 can be inserted into the first transport lock opening 9 in such a way that the first locking element 10 engages behind material of the associated side wall 4 against the insertion direction of the peg 8. For example, the first locking element 10 may be designed as a clamping pin or clamping sleeve. The first transport lock opening 9 can be designed as a through hole. Preferably, the peg 7 may be slotted, wherein a slot preferably aligned in the transverse direction (x-direction) of the chain link 1 connects an outer edge to the first transport lock opening 9. This makes it easier to plug in the first locking element 10. In addition, the peg 7 can be clamped outwards by the first locking element 10 in the longitudinal direction (z-direction) of the chain link 1 in order to clamp the peg 7 in the opening 8.

Preferably, the chain link 1 may have a spacer 11 for every force introduction component 5. This means that the chain link 1 has a first spacer 11 for the first force introduction component 5 and a second spacer 11 for the second force introduction component 5. The spacers 11 rest on the associated force introduction component 5. In particular, the spacers 11 rest on the main body 6 of the associated force introduction component 5. The spacers 11 are flush with an upper edge of the associated side wall 4 in the vertical direction (y-direction) of the chain link 1 and/or form an outermost edge (in the y-direction) of the chain link 1. In the example shown, the spacers 11 are flush with the upper edge of the respective side wall 4. This means that a thickness of the spacers 11 corresponds to a distance (in the y-direction) between the upper edge of the side wall 4 and an upper edge of the opening 8 in the side wall 4. In particular, the spacer 11 may be substantially flat. In addition, the thickness of the spacer can substantially correspond to the thickness of the force introduction component 5.

Preferably, the spacer 11 and the force introduction component 5 may have second transport lock openings 12 aligned with each other. In the second transport lock openings 12, a second locking element for temporary attachment of the spacer 11 to the force introduction component 5 can be inserted. For example, the second transport lock opening 12 of the spacer 11 and/or the force introduction component 5 may be designed as a through hole. The second locking element can be designed as a spring pin, for example. Preferably, the spacer 11 and/or the force introduction component 5 may be slotted, wherein a slot preferably aligned in the transverse direction (x-direction) of the chain link 1 connects an outer edge to the second transport lock opening 12. This makes it easier to plug in the second locking element.

For example, every force introduction component 5 may have at least one mounting hole 13 in the vertical direction of the chain link. In the example shown, every force introduction component 5 has two mounting holes 13. Through the mounting hole 13, the chain link 1 can be fastened to the plate belts of the plate belt conveyor 3. For example, every force introduction component 5 can be fastened to the plate belts by means of connecting elements that reach through in the vertical direction (y-direction) of the chain link 1. In the example shown, the mounting hole 13 has a rectangular cross-section, so that an interlocking fastening of the force introduction component 5 secured against twisting is possible via a carriage bolt (especially in the vertical direction (y-direction) from below).

Preferably, the (or any) spacer 11 may have at least one mounting hole 14. In the example shown, the spacer 11 has two mounting holes 14. The mounting hole 14 may preferably be designed as a through hole. The mounting hole 14 may be aligned with the mounting hole 13 of the force introduction component 5. A cross-section of the mounting hole 14 may be at least as large as the cross-section of the mounting hole 13 of the force introduction component 5, preferably having the same cross-section.

Preferably, the side walls 4 and/or the force introduction components 5 may be made of a steel with a material strength of 700 N/mm² to 1600 N/mm².

The two side walls 4 of a chain link 1 may be firmly connected to each other by means of two connecting elements 15 spaced apart in the longitudinal direction (z-direction) of the chain link 15. In particular, the two side walls of the chain link 1 may be connected to each other via pins 16 or sleeves 17. For this purpose, a connecting hole 18 designed as a through hole is formed for each connecting element 15 in each side wall 4. The opening 8 for the reception of the peg 7 is preferably placed in the middle between the two connecting holes 18.

To form the plate-link chain 2, a large number of chain links 1 are hingedly connected to each other. A first number of chain links 1 are designed as inner plates 19 and a second number of chain links 1 are designed as outer plates 20. The number of inner plates 19 corresponds to the number of outer plates 20. The inner plates 19 and the outer plates 20 are arranged alternately in a chain circulation direction. In this case, adjacent inner plates 19 and outer plates 20 are hinged together in the chain circulation direction. This means that the plate-link chain 2 contains a large number of plates in FIG. 1 made up of an inner plate 19 and an outer plate 20.

The distance (in x-direction) between the side walls 4 of a chain link 1 designed as an inner plate 19 is less than the distance (in the x-direction) between the side walls 4 of a chain link 1 designed as an outer plate 20. In particular, the side walls 4 of the inner plates 19 are arranged in the transverse direction (x-direction) between the side walls 4 of the outer plates 20. The chain links 1 adjacent in the chain circulation direction (i.e., in each case an inner plate 19 and an outer plate 20) are hinged to each other in that the connecting elements 15 are arranged coaxially into each other. Since the chain links 1 designed as an inner plate are preferably connected to each other via the sleeves 17 and the chain links 1 designed as outer plates 20 are preferably connected to each other via the pins 16, the pins 16 can be accommodated within the sleeves 17 so that the two chain links 1 can be pivoted relative to each other around the pin or sleeve axis but are connected to each other in the longitudinal direction.

The side walls 4 of the outer plates 20 and the side walls 4 of the inner plates 19 may preferably have substantially the same structure, with the exception of the formation of the connecting holes 18. The force introduction components 5 of the outer plates 20 and the force introduction components 5 of the inner plates 19 may preferably have substantially the same structure, with the exception of the length of the force introduction components 5, which in the case of the inner plates 19 is much longer the closer the side walls 4 of the inner plates 19 are disposed to each other. In addition, a chain link 1 designed as an outer plate 20 may have a contour feature 21, for example in the form of a notch in the force introduction component 5, which is not formed at the inner plate 19, in order to be able to distinguish an outer plate 20 or its force introduction component 5 from the inner plate 19 or its force introduction component 5.

Figure 5:
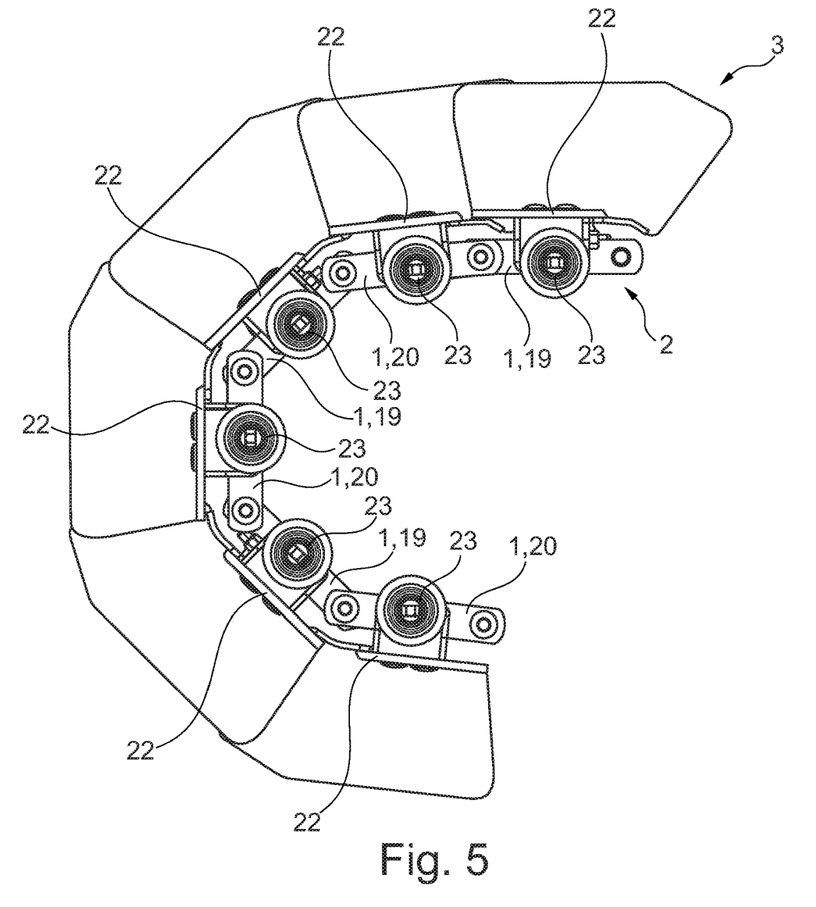
FIG. 5 is a side view of a part of a plate belt conveyor with the plate-link chain.

FIG. 5 shows a side view of the plate belt conveyor 3 and the plate-link chain 2. The plate belt conveyor 3 has a large number of conveyor plates 22. The conveyor plates 22 can be driven via the plate-link chain 3 in the chain circulation direction. The chain links 1 are fastened via the connecting elements, which reach through the force introduction components 5 in the vertical direction of the chain links 1. In addition, the plate belt conveyor has 3 non-driven rollers 23, which can be used to absorb the weight of the bulk material to be conveyed.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A chain link for a plate-link chain of a plate belt conveyor, the chain link comprising:
   two substantially flat side walls that are spaced apart from, and parallel to, each other in a transverse direction of the chain link and securely fastened together; and
   two force introduction components that are fastened to the associated side wall of the plate belt conveyer and protrude outwards in the transverse direction from the associated side wall, wherein each force introduction component of the two force introduction components is separate from the side walls, and wherein each force introduction component of the two force introduction components is interlockingly connected to its associated side wall in a longitudinal direction of the chain link.

2. The chain link according to claim 1, wherein the force introduction component has a main body and a peg protruding from the main body, wherein the peg of the force introduction component is inserted into an opening in the associated side wall in the transverse direction.

3. The chain link according to claim 2, wherein the two force introduction components are plugged into the associated side wall in opposite directions, and wherein the two force introduction components are each inserted from the outside into the associated side wall.

4. The chain link according to claim 2, wherein an extension of the opening in a longitudinal direction of the chain link is substantially equal to the width of the peg and/or the extension of the opening in a vertical direction of the chain link is substantially equal to the thickness of the pin, and wherein the peg and the opening are matched to each other in such a way that the peg is inserted into the opening and pulled out of the opening without tools.

5. The chain link according to claim 2, wherein, in the peg, a first transport lock opening is formed, into which a first locking element for temporary attachment of the force introduction component to the associated side wall is plugged in such a way that the first locking element engages behind material of the associated side wall against the insertion direction of the peg.

6. The chain link according to claim 1, wherein the chain link has a spacer for every force introduction component, which rests on the force introduction component and is flush with an upper edge of the associated side wall in a vertical direction of the chain link and/or forms an outermost edge in a vertical direction of the chain link.

7. The chain link according to claim 6, wherein the spacer and the force introduction component have second transport lock openings aligned with each other, into which a second locking element for temporary attachment of the spacer to the force introduction component is inserted.

8. The chain link according to claim 1, wherein the side walls and/or the force introduction components are formed of a steel having a material strength of 700 N/mm$^2$ to 1600 N/mm$^2$.

9. A plate-link chain for a chain conveyor, comprising a plurality of chain links according to claim 1, wherein a first number of the chain links are designed as inner plates, a second number of chain links are designed as outer plates, wherein the inner plates and the outer plates are arranged alternately in a chain circulation direction, wherein adjacent inner plates and outer plates are hinged to each other in the direction of chain circulation, and wherein the side walls of the inner plates are arranged in the transverse direction between the side walls of the outer plates.

10. A chain conveyors or a plate belt conveyer comprising a plate-link chain according to claim 9 and a plurality of conveyor plates that are driveable by the plate-link chain in the chain circulation direction, wherein the conveyor plates are fastened to the chain links via the force introduction components.

11. A chain link for a plate-link chain of a plate belt conveyor, the chain link comprising:
  two substantially flat side walls that are spaced apart from, and parallel to, each other in a transverse direction of the chain link and securely fastened together; and
  two force introduction components that are fastened to the associated side wall of the plate belt conveyer and protrude outwards in the transverse direction from the associated side wall,
  wherein each force introduction component of the two force introduction components is separate from the side walls,
  wherein each force introduction component of the two force introduction components is interlockingly connected to its associated side wall in a longitudinal direction of the chain link,
  wherein the force introduction component has a main body and a peg protruding from the main body, wherein the peg of the force introduction component is inserted into an opening in the associated side wall in the transverse direction, and
  wherein, in the peg, a first transport lock opening is formed, into which a first locking element for temporary attachment of the force introduction component to the associated side wall is plugged in such a way that the first locking element engages behind material of the associated side wall against the insertion direction of the peg.

12. A chain link for a plate-link chain of a plate belt conveyor, the chain link comprising:
  two substantially flat side walls that are spaced apart from, and parallel to, each other in a transverse direction of the chain link and securely fastened together; and
  two force introduction components that are fastened to the associated side wall of the plate belt conveyer and protrude outwards in the transverse direction from the associated side wall,
  wherein each force introduction component of the two force introduction components is separate from the side walls,
  wherein each force introduction component of the two force introduction components is interlockingly connected to its associated side wall in a longitudinal direction of the chain link,
  wherein the chain link has a spacer for every force introduction component, which rests on the force introduction component and is flush with an upper edge of the associated side wall in a vertical direction of the chain link and/or forms an outermost edge in a vertical direction of the chain link, and wherein the spacer and the force introduction component have second transport lock openings aligned with each other, into which a second locking element for temporary attachment of the spacer to the force introduction component is inserted.

* * * * *